United States Patent [19]
Ohleyer

[11] 4,090,409
[45] May 23, 1978

[54] APPARATUS FOR TURNING A TURBINE SHAFT

[75] Inventor: Bernd Ohleyer, Wesel, Germany

[73] Assignee: Siemens Aktiengesellschaft, Berlin and Munich, Germany

[21] Appl. No.: 796,307

[22] Filed: May 12, 1977

Related U.S. Application Data

[63] Continuation of Ser. No. 637,404, Dec. 3, 1975, abandoned.

[30] Foreign Application Priority Data

Dec. 4, 1974 Germany .............................. 2457354

[51] Int. Cl.² ........................................... F16H 27/02
[52] U.S. Cl. .................................... 74/128; 60/657
[58] Field of Search ................... 74/128; 60/456, 657, 60/698, 720

[56] References Cited

U.S. PATENT DOCUMENTS

| | | | |
|---|---|---|---|
| 2,329,859 | 9/1943 | Snell | 74/128 |
| 3,101,013 | 8/1963 | Ayers et al. | 74/128 |
| 3,150,694 | 9/1964 | Williams | 60/657 |
| 3,501,968 | 3/1970 | Fredell | 74/128 |
| 3,911,685 | 10/1975 | Cronin et al. | 60/657 |

FOREIGN PATENT DOCUMENTS 223,838  10/1942  Switzerland ........................... 60/657

Primary Examiner—Benjamin W. Wyche
Assistant Examiner—Wesley S. Ratliff, Jr.
Attorney, Agent, or Firm—Kenyon & Kenyon, Reilly, Carr & Chapin

[57] ABSTRACT

A gear is mounted to a turbine shaft and a pin disposed on a vertical link for engaging the gear when the link is pulled up for breaking loose a turbine shaft or other machine shaft which has been at a standstill.

4 Claims, 5 Drawing Figures

APPARATUS FOR TURNING A TURBINE SHAFT

This is a continuation of application Ser. No. 637,404 filed Dec. 3, 1975 now abandoned.

BACKGROUND OF THE INVENTION

This invention relates to rotating machinery in general and more particularly to apparatus for turning a shaft in such machinery after it has been at rest for a period of time.

When a piece of heavy rotating machinery such a turbine is shut down and the rotor stands still for a long period of time a certain amount of distortion of the rotor occurs during cooling. If a turbine were immediately started up again in this condition, there could be rubbing and a destriction of the blade gap seals. Because of this, turning gear or jacking gear is normally used with turbines to turn them over before being started up during a warming up process. The same devices are used to periodically rotate the turbine a certain number of degrees during long periods of shut-down to avoid a flat being formed at any one spot on the bearings. A type of device for this purpose in the form of a hydraulic turbine mounted on the shaft is disclosed in German Patent No. 975,676. However, when a turbine rotor or the like has been at standstill for a long period of time there is large breakaway torque required to get the rotor moving. This can be so large as to require the jacking gear, such as a hydraulic turning device, to be made of an uneconomically large size if it is to overcome this torque.

In view of this problem, the need for an apparatus for use with a machine shaft such as a turbine rotor which can be used to easily break it loose after it has been standing still for a long time and furthermore to permit a stepwise turning of the shaft, e.g. the turbine rotor, is evident.

SUMMARY OF THE INVENTION

The present invention provides a solution to this problem. To accomplish this object, a gear is mounted to the machine shaft to be turned. At the end of a linkage which is vertically disposed and arranged to be moved vertically, a pin is secured which can be brought into engagement with the teeth of the gear as the linkage is pulled up. In this manner, the machine shaft can be rotated by small steps.

In accordance with the illustrated embodiment the linkage advantageously includes a lifting rod guided in a stationary sleeve. At its lower end is a rectangular frame supported for rotation on the end of the lifting rod and having a pin for engaging the gear as its end rung. The drive, which pulls up the shaft, may comprise a manually operated lever having one end engaging a hole in the lifting rod at its upper end and having a fulcrum on a support jack. In another embodiment, permitting remote control of the turning device, the drive is coupled to a hydraulic cylinder having a plunger which is guided therein and fastened to the upper end of the lifting rod. In that case, hydraulic fluid such as pressurized oil, is coupled to act on both sides of the plunger or piston under the control of a solonoid slide valve. It is not necessary that a free shaft extension be available to use the turning device of the present invention. The drive and linkage can be supported directly in the bearing house of the machine shaft.

DETAILED DESCRIPTION OF THE PREFERRED EMBODIMENT

Figure 1:
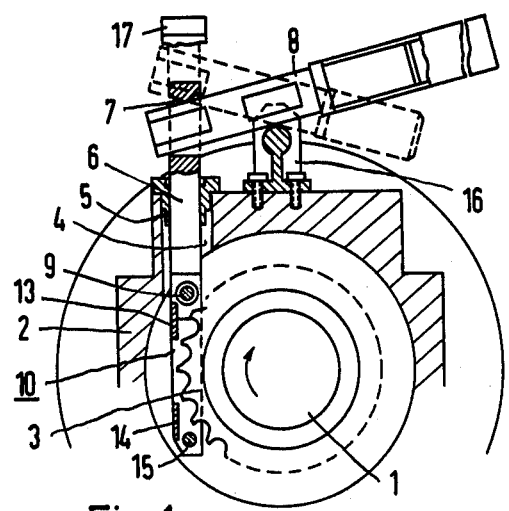
FIG. 1 is a cross section through a machine shaft having a first embodiment of the lifting device of the present invention attached.

FIG. 1 illustrates a first embodiment of the present invention. A gear 3 is shrunk onto a turbine shaft 1 in rotor bearing housing. In a plane approximately at the root circle radius of the gear from the center plane of the machine, a vertically disposed hole 4 is formed in the bearing housing 2. In the upper end of the hole 4 a sleeve 5 is inserted. The sleeve 5 is used to guide the lifting rod 6 which extends from outside the bearing housing 6 to its interior. A hole 7 is provided in the upper portion of the lifting rod 6 which is engaged by one end of a lever 8.

Figure 2:
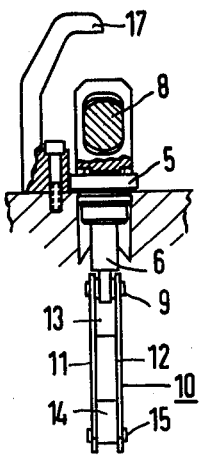
FIG. 2 is a side view, partially in cross section, through the linkage of FIG. 1.

At the lower end of the lifting rod 6 a frame 10 is suspended for rotation about a pin 9. As is clear from the side view of FIG. 2, the frame 10 includes lateral bars 11 and 12 rigidly connected to each other by the means of rear side cross bars 13 and 14. A pin 15, which will thus be disposed transverse to the gear 3, is inserted into the lower end of frame 10.

A lever 8 has its one end disposed in hole 7 of the lifting rod 6 and rests on a support jack 16 mounted to the top side of the bearing house 2 forming the fulcrum point. By pressing down on the other, righthand end of the lever 8, the lifting rod 9 and frame 10 are moved upward until they hit a stop 17. In this process the pin 15 of frame 10 engages a tooth of the gear 3 and thus rotates the turbine rotor through a small angular amount. Through a proper selection of the length of the lever arm the necessary torque for breaking loose the rotor can be developed in a simple manner through what is essentially a lifting of the turbine shaft by pulling up the linkage and engaging the gear and thus overcoming the bearing friction. A suitable lever arm can be attained by using a tube or pipe pushed over the end of the lever 8. Depending on the coefficient of friction at the bearing, the shaft will continue to turn by itself. With a repeated operation of the device of the present invention, it thus becomes possible to obtain a quasi-continuous rotation of the shaft. If the turbine is to be started up after some turning over of this nature, it is advisable to remove the pipe 18 before such operation is commenced in order to prevent unintentional use of the turning device while the turbine is operating.

In the illustrated embodiment, the device is shown for a righthand direction of rotation of the turbine rotor. Lefthand rotation can be accomplished simply by reversing the arrangement so that it is on the right hand side of the shaft 1.

Figure 4:
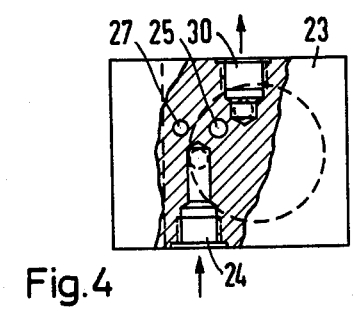
FIG. 4 is a cross section through 4—4 of FIG. 3.
Figure 3:
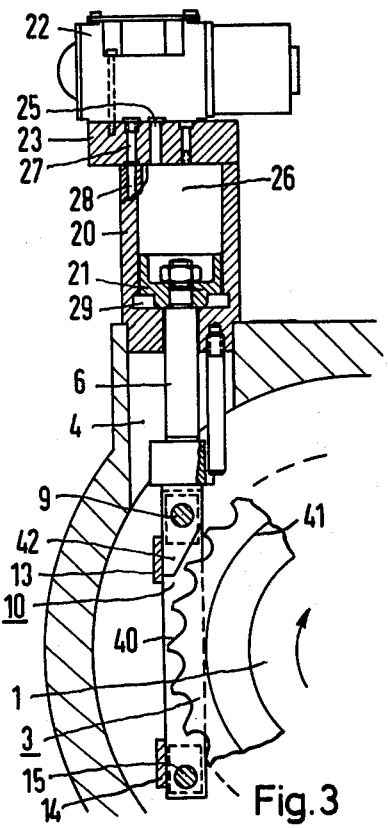
FIG. 3 is a view similar to that of FIG. 1 showing a second embodiment of the present invention which is operated by a hydraulic cylinder.

The embodiment just illustrated is operated manually. Where operation by remote control is desired, the arrangement illustrated by the FIG. 3 may be used. In this arrangement, a hydraulic drive is used to lift the lifting rod 6. As illustrated by FIG. 3, this arrangement does not have a sleeve 5 in the opening 4 but instead disposes in that opening the bottom of a hydraulic cylinder 20. Within the cylinder 20 is a piston or plunger 21 to which the lifting rod 6 is attached. The piston 21 is arranged so that it can be driven upward or downward. For this purpose a magnetic valve 22, i.e., a solonoid slide valve, is provided to direct a supply of hydraulic fluid, e.g. oil, under pressure to the space 26 above the piston 21 or the space 29 below the piston 21. With reference to both FIG. 3 and FIG. 4, which is a cross-sectional view through the top cover 23 of the hydraulic arrangement, it can be seen that there is an inlet 24 which will be supplied with hydraulic fluid under pressure. In addition, in the top, there are openings 25 and 27 and an outlet 30. From FIG. 3, it can be seen that the opening 25 is coupled to the space 26 above the piston 21 and the opening 27 through a channel 28 in the wall of the cylinder to the space 29 below the cylinder.

Figure 5:
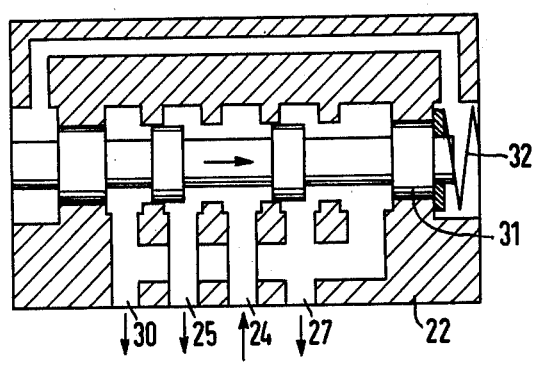
FIG. 5 is a cross-sectional view of the solonoid slide valve of the FIG. 3.

FIG. 5 illustrates a cross-sectional view of the solonoid slide valve 22 of FIG. 3 and the manner in which it couples the hydraulic fluid under pressure to the various openings. As indicated by FIG. 5, the hydraulic fluid under pressure enters through the channel 24 which was described above. Depending on the position of the slider 31 in the slide valve 22, this oil under pressure will either be directed through the outlet 27 or the through the outlet 25. In the unenergized position which is shown on the figure, the slider 31 is pushed to the right by a spring 32 and the fluid will be directed through the opening 25 and into the space 26 to bring the piston downward as shown on FIG. 3. If the slide valve is operated and moved in the direction of the arrow shown on the slider, the path to the outlet 25 will be closed off and that to the outlet 27 opened up. As described, the hydraulic fluid will be directed through the channel 28 to the space 29 below the piston 21 pushing it upward. As it moves upward, the pin 15 will engage the gear teeth on the gear 3 in the manner described above. In the position where the valve is energized, i.e., where the slider 31 is moved to the right, a connection is established between the passageway 25 and the outlet connection 30 so that the fluid in the space 26 may be discharged. Similarly, in the position shown, there is a connection between the o opening 27 and the outlet connection 30 for permitting fluid to flow out as the piston 21 moves downward. Thus, from the position shown in the drawing, if the solonoid valve 22 is energized, the slider moves to the right causing fluid to enter the space 29 below the piston. This causes the p piston to move upward and the pin 15 to engage the gear turning the shaft. The valve can then be de-energized after a predetermined time delay period or may be switched off by hand. If further turning is required, repeated operation may be carried out. When the solonoid slide valve 22 is de-energized the spring 32 pushes the slider 31 back to the position shown so that the hydraulic fluid under pressure is driven into the space 26 to push the piston downward. The fluid then in the space 29 below the piston is forced out through the channel 28, the opening 27 and then through passages in the valve to the outlet 30.

In some cases, particularly with compressor drive turbines with leaky check valves, the turbine can rotate with a reverse direction of rotation. In order to prevent engagement of the frame 10 with the gear under such circumstances, the top sides of the teeth 40 of the gear 3 are bevelled. Furthermore, the bars 11 and 12 of the frame are arranged so that they abut against shoulders 41 on the gear 3.

As a further preventive measure, a tongue 42 is provided against which the cross piece 13 abuts to prevent the frame from swinging too far inwardly. The tonque 42 is securely attached to the lifting rod 6.

In order to obtain the necessary hydraulic fluid under pressure, existing systems can be used. For example, bearing oil, control oil or shaft lift oil supplies may be used. Since the device of the present invention positively develops the torque necessary to break loose the turbine, a less expensive turning or jacking device may be constructed. In some cases the turning device, which is often in the form of an oil turbine, can be completely dispensed with and the device of the present invention alone used for jacking the turbine. It will, of course, be recognized that the device of the present invention can be used for periodically rotating the turbine shaft when the turbine remains at rest for a long period of time.

Thus, an improved device for overcoming the break-away torque in a rotating machine such as a turbine has been shown. Although specific embodiments have been illustrated and described, it will be obvious to those skilled in the art that various modifications may be made without departing from the spirit of the invention, which is intended to be limited solely by the appended claims.

I claim:

1. Apparatus for rotating a turbine shaft comprising:
   a. a gear securely fastened to the turbine shaft in the vicinity of a bearing housing thereof;
   b. a lifting rod;
   c. a stationary sleeve disposed in said bearing housing for guiding said lifting rod, said lifting rod disposed within said sleeve for vertical motion therein;
   d. means for engaging said gear consisting of a rectangular frame rotatably suspended from the bottom of said lifting rod, the bottom of said frame comprising a pin for engagement of said gear, said pin disposed so that it is normally located below the center of said shaft, whereby said pin will engage said gear only during upward motion of said lifting rod and said rectangular frame so that said rectangular frame and pin act in a pulling manner; and
   e. drive means coupled to the upper end of said lifting rod for moving it upward to rotate said gear thereby rotating said machine shaft.

2. Apparatus according to claim 1 wherein said drive means comprise a manually operated lever engaging a hole in the upper end of said lifting rod, said lever being rotatable about a fulcrum point formed by a support jack.

3. Apparatus according to claim 1 wherein said drive means comprise a hydraulic cylinder, a piston guided within said cylinder, said lifting rod being coupled to said piston and means to supply a hydraulic fluid selectively to either side of said piston.

4. Apparatus according to claim 3 wherein said means to supply hydraulic fluid comprise a solonoid operated slide valve.

* * * * *